United States Patent Office

2,772,152
Patented Nov. 27, 1956

2,772,152

TOBACCO DESUCKERING COMPOSITIONS

Robert Earl Emond, Mooretown, Lambton, Ontario, and Warren C. Pattenden, Courtright, Lambton, Ontario, Canada, assignors to Esso Research and Engineering Company, a corporation of Delaware No Drawing. Application April 29, 1954, Serial No. 426,574

5 Claims. (Cl. 71—2.3)

The present invention relates to improved agricultural compositions for desuckering tobacco plants and tomato plants. More particularly, the present invention relates to an improved composition and process for applying the same that results in higher activity of control and less damage to the crop than previous compositions and their methods of application.

Tobacco is a billion dollar crop in the United States. Much of the labor required to grow this crop is spent in manually breaking out the sucker buds to increase the leaf yield and quality. In this way, all available plant nutrients could be utilized in producing large uniform leaves. It is customary to break the main leader by hand when the tobacco plant begins to flower, an operation called "topping." When this is accomplished, the plant nutrients induce rapid development of sucker growth at the juncture of the stem and each leaf. In the past, to obtain the largest leaves possible, the suckers have been removed by hand as often as three times in one season, and is a costly operation in terms of manpower.

A marked step forward was taken when it was found that certain chemicals and certain oils, particularly mineral oils, alone or in the form of emulsions, had the property of desuckering tobacco and tomato plants without adversely affecting tobacco or tomato quality. Specifically, petroleum mineral white oils can be utilized for this purpose if they are mainly paraffinic and/or naphthenic, such as are prepared by exhaustive sulfuric acid treatment of selected petroleum distillates whereby substantially all aromatics and heterocyclic materials are removed. These acid-treated oils have specific gravities in the range of about .800–.885, viscosity range SUS at 100° F. of 80–370, and a boiling range predominantly of about 550–1000° F. To increase the product stability, decrease tendency to rot formation and to increase the period of effectiveness, it has hitherto been found that emulsions of these oils are effective.

Though this represents a significant step forward in the art, not all problems associated with the use of white oil desuckering agents disappeared. Thus, when the oil, either alone or as an emulsion, is sprayed onto the topped plants, there is a tendency for the composition to be deposited on the tobacco leaves as well as on the suckers. Thus, compositions sprayed from the present "clip-oil" machines now used frequently are scattered on the leaves. This misdirected spray causes the leaves to be burned, resulting ultimately in consumer dissatisfaction.

Furthermore, the most stable emulsion tends to break under exposure to the elements. With oil emulsions, it has been determined that there is a reduction in sucker control after about two weeks.

Since oil and emulsions flow rapidly (within 24 hours) to the ground line of the plant, there has been observed frequently severe rotting, particularly under moist conditions, as a result of attacking secondary soil organisms.

It is, therefore, an important object of the present invention to set forth a desuckering composition which overcomes the defects and disadvantages of the prior art, which will provide a sucker control activity of greater extent and longer duration than hitherto found possible, and which will give an increased yield of desired product.

Other and further objects and advantages of the present invention will be made clear hereinafter.

It has now been found that excellent sucker control is achieved by employing, as sucker control agents, pastes and greases containing, as active agent, a white oil having an SUS viscosity in the range of 80–1000 at 100° F. and having an ASTM unworked penetration of 150 to 420. The paste must not be too thin so that it runs, not must it be too viscous. If it is too viscous, the concentration of the thickening agent is too high and the rate of bleeding will be too low or nil. While the paste may be made by using any of the soaps or by using other types of thickening agents, such as silicas, modified clays, etc. customarily employed in the manufacture of greases, an excellent one may be prepared by coreacting stearic acid, lye and white oil.

The suckers are killed by applying the desuckering agent just below the exposed surface of the freshly "topped" tobacco plant. The killing action of the agent appears to take place after it runs down the stem and reaches the active sucker tissue. Thus, when it is applied as an oil or emulsion, the flow is rapid, as pointed out. However, when applied as a paste in accordance with the present invention, the oil "bleeds" from the paste and runs only slowly down the side of the stem at a rate of about 2 inches in 24 hours, thus prolonging the activity and control considerably.

The product of the present invention may be prepared, in one embodiment, as follows:

Five to 15 grams of stearic acid, 1.5–5 grams of 50 Bé. NaOH and 90 grams of a white oil of 150–350 SUS at 100° F. were heated together to drive off water and produce a thin paste having inspection as follows:

Penetration (ASTM) _____ 300–400
Penetration (5 sec.) using a 26 gram cone
  at 91° F. _____ 200–300

In general, the paste or grease should be approximately neutral, containing less than about 0.4% free acid and less than 0.1% free alkali.

Pastes and greases may also be prepared by employing other soaps such as that prepared from oleic, palmitic or coconut fatty acids and other alkaline materials such as caustic, lithium hydroxide and carbonate, potash, and the like. In general, the grease forming constituent, such as soap, is present to the extent of 2–40% of the mineral oil.

The paste may be applied to the plant by pressure means, brushes and the like. A particularly effective method involves packaging the paste in collapsible lead tubes and squeezing the material from the tube out of the plant to form a mound on the broken end of the tobacco stem. From 2–10 grams may be used. Such a method avoids breakdown of emulsion in storage; the composition is ready for use directly without requiring addition of water which, in the past, has caused frequent precipitation in the case of emulsions, particularly when hard water was employed. The latter advantages are obtained no matter how the paste is applied, for they reflect the benefits to be derived from use of a paste versus an oil, emulsified or not.

The advantages accruing from the present invention may be further shown by the following data obtained at demonstration plots situated at two locations about 200 miles apart. In each location the plots were replicated four times and each plot consisted of ten plants. Plots were selected from a table of random numbers.

After topping the tobacco plant, the paste was applied to the broken stem of the plant in a similar manner as the emulsions. Several weeks after treating, the sucker control was evaluated by three trained evaluators according to a predetermined set of values.

1 = no visible suckers
10 = no reduction in suckers

*Results from location A*

| Treatment | Sucker Control Evaluation 2 Weeks after Topping | Percent Control of Suckers |
|---|---|---|
| No treatment | 8.00 | 28 |
| Hand suckered | 7.12 | 41 |
| White oil emulsion @ 4 cc. per plant | 5.08 | 70 |
| Paste @ 4 cc. per plant [1] | 3.72 | 89 |
| Necessary Difference between means at 95% level | 1.97 | |

[1] Formula (percent by weight):
77% white oil.
20% stearic acid.
3% dry sodium hydroxide.

*Results from location B*

| Treatment | Sucker Control Evaluation 2 Weeks after Topping | Percent Control of Suckers |
|---|---|---|
| None | 5.86 | 53 |
| Handsuckered | 1.64 | 100 |
| White oil emulsion @ 4 cc. per plant | 3.30 | 86 |
| Paste @ 4 cc. per plant [1] | 1.96 | 100 |
| Necessary Difference between means at 95% level | 1.23 | |

[1] Same formula as at location A.

While sucker control is of little value in itself if an increase in yield does not accrue, by using such a paste formula, the following yield data obtained by the experiments at Location A show the value of such a composition.

*Yield*

| Treatment | Weight of top two leaves of forty plants of cured tobacco, grams | Percent Increase in yield (based on untreated) |
|---|---|---|
| None | 908 | |
| Hand suckered by evaluators | 908 | 0 |
| Hand suckered from growers field | 908 | 0 |
| White oil emulsion @ 4 cc. per plant | 1,044 | 15 |
| Paste @ 4 cc. per plant [1] | 1,188 | 20 |
| Maleic Hydrazide (a competitive water solution) | 681 | |

[1] Same formula as at location A.

These examples not only point out the increased effectiveness of the paste as a sucker control agent, but also show that higher yields are obtainable thereby over other methods of sucker control.

What is claimed is:

1. A tobacco desuckering grease composition which comprises in combination a petroleum mineral white oil having a viscosity of 80–1000 SUS at 100° F. and from 2–40% of a grease forming component, said paste being further characterized in having an ASTM penetration (unworked) in the range of 150–420.

2. A tobacco desuckering grease having an ASTM penetration (unworked) of from 150–420 comprising in combination a whilte oil of 80–1000 SUS viscosity at 100° F. and from 2–40% of a soap of a long chain fatty acid.

3. A tobacco desuckering composition having an unworked ASTM penetration in the range of from 150–420 and comprising a white oil of 80–1000 SUS viscosity at 100° F. and from 2–40% of sodium stearate.

4. The composition of claim 3 wherein said penetration is 300–400, and said viscosity is 150–350 SUS at 100° F.

5. An improved process for desuckering tobacco plants which comprises applying to the topped plant a grease having an unworked ASTM penetration of 150–420 and comprising in combination a white oil of 80–1000 SUS viscosity at 100° F. and from 2–40% of a soap of a long chain fatty acid.

References Cited in the file of this patent
UNITED STATES PATENTS
2,129,836    Goodman _____ Sept. 13, 1938

OTHER REFERENCES

"Research and Farming," Summer 1952, pages 2 to 4, (published by the Ag. Exp. Sta., North Carolina State College, Raleigh, North Carolina.)